(12) United States Patent
Webb

(10) Patent No.: US 10,517,393 B2
(45) Date of Patent: Dec. 31, 2019

(54) PAD FOR SUPPORTING A USER'S WRISTS, LOWER ARMS, AND KEYBOARD WHILE TYPING

(71) Applicant: Noel Webb, Woodland Hills, CA (US)

(72) Inventor: Noel Webb, Woodland Hills, CA (US)

( * ) Notice: Subject to any disclaimer, the term of this patent is extended or adjusted under 35 U.S.C. 154(b) by 0 days.

(21) Appl. No.: 16/133,442

(22) Filed: Sep. 17, 2018

(65) Prior Publication Data

US 2019/0082825 A1 Mar. 21, 2019

Related U.S. Application Data

(60) Provisional application No. 62/559,873, filed on Sep. 18, 2017.

(51) Int. Cl.
  *A47B 21/00* (2006.01)
  *A47B 21/03* (2006.01)
  *G06F 3/039* (2013.01)
  *G06F 3/023* (2006.01)
  *A47B 23/04* (2006.01)

(52) U.S. Cl.
  CPC .......... *A47B 21/0371* (2013.01); *G06F 3/039* (2013.01); *A47B 23/042* (2013.01); *A47B 2021/0307* (2013.01); *G06F 3/023* (2013.01)

(58) Field of Classification Search
  CPC ........ A47B 2021/0307; A47B 21/0371; G06F 3/0395
  USPC ..................................................... 248/118.1
  See application file for complete search history.

(56) References Cited

U.S. PATENT DOCUMENTS

| | | | | |
|---|---|---|---|---|
| 134,116 A * | 12/1872 | West | .......................... | B43L 1/02 |
| | | | | 248/118.1 |
| 744,287 A * | 11/1903 | Brasel | ................ | A47B 21/0371 |
| | | | | 248/118.3 |
| 5,040,757 A * | 8/1991 | Benaway | ........... | A47B 21/0371 |
| | | | | 248/118.3 |
| 5,125,606 A * | 6/1992 | Cassano | ............. | A47B 21/0371 |
| | | | | 248/118 |
| 5,228,655 A * | 7/1993 | Garcia | ............... | A47B 21/0371 |
| | | | | 248/118 |
| 5,234,186 A * | 8/1993 | Powell | ................ | A47B 21/0371 |
| | | | | 248/118.1 |
| 5,464,292 A * | 11/1995 | Grant | .......................... | B41J 5/10 |
| | | | | 248/118.1 |
| 5,547,154 A * | 8/1996 | Kirchhoff | .......... | A47B 21/0371 |
| | | | | 248/118.3 |
| 5,628,483 A * | 5/1997 | Smith | ................ | A47B 21/0371 |
| | | | | 248/118 |

(Continued)

*Primary Examiner* — Bradley Duckworth

(57) ABSTRACT

A pad for supporting a user's wrists, lower arms, and keyboard while typing has a support panel, a shelf, a supportive liner, and a textured liner. The support panel is a semi-rigid piece of flat material that has the supportive liner covering a top surface and the textured liner covering a bottom surface. The shelf is connected along one edge of the support panel so that the shelf can act as a riser that supports one end of the keyboard. The shelf and the support pad work in concert to create a sufficiently level typing surface for the user. As such, the user's wrists do not need to be bent while typing. Specifically, a height of the shelf is less than a height of the support panel. This configuration enables the typing surface of the keyboard to be placed coplanar to the top surface of the pad.

9 Claims, 7 Drawing Sheets

(56) References Cited

U.S. PATENT DOCUMENTS

| | | | | |
|---|---|---|---|---|
| 5,713,544 | A * | 2/1998 | Wolf | A47B 21/0371 248/118 |
| 5,803,416 | A * | 9/1998 | Hanson | A47B 21/0371 248/118 |
| 6,003,446 | A * | 12/1999 | Leibowitz | A47B 23/002 108/43 |
| 6,135,399 | A * | 10/2000 | Savoie | A47B 21/0371 248/118 |
| 6,179,254 | B1 * | 1/2001 | Min-Chen | G05G 1/62 248/118.1 |
| 6,494,418 | B1 * | 12/2002 | Wolf | A47B 21/0371 248/118 |
| 7,108,234 | B2 * | 9/2006 | Ritchey | A47B 21/0314 248/118.1 |
| 9,424,986 | B2 * | 8/2016 | Wang | H01F 38/14 |
| 9,532,646 | B2 * | 1/2017 | Sears | A47B 21/0371 |
| 2003/0038782 | A1 * | 2/2003 | Dobrich | G06F 3/0395 345/163 |
| 2011/0309212 | A1 * | 12/2011 | Guerrieri | A61H 23/02 248/118 |
| 2014/0345074 | A1 * | 11/2014 | Lee | A47L 25/00 15/210.1 |
| 2016/0088931 | A1 * | 3/2016 | Schneider | A47B 21/03 108/28 |
| 2018/0239075 | A1 * | 8/2018 | Chou | G02B 6/0023 |

\* cited by examiner

PAD FOR SUPPORTING A USER'S WRISTS, LOWER ARMS, AND KEYBOARD WHILE TYPING

The current application claims a priority to the U.S. Provisional Patent application Ser. No. 62/559,873 filed on Sep. 18, 2017.

FIELD OF THE INVENTION

The present invention relates generally to a keyboard accessory. More specifically, the present invention is a keyboard wrist rest that is used to support one end of a keyboard, such that the keyboard is maintained in an orientation that creates a sufficiently level typing surface for a user.

BACKGROUND OF THE INVENTION

Many keyboards are constructed with an angular shape that requires a user's wrist to be bent upward while typing. This requirement, however, has been shown to cause chronic problems for individuals who spend extended periods working on a computer. These problems include, but are not limited to, carpal tunnel syndrome, wrist strain, and decreased productivity.

The present invention is designed to address this issue by providing a wrist rest that props up one end of a keyboard such that the present invention creates a sufficiently level typing surface for the user. Additionally, the present invention is a wrist rest that is designed to act as a soft platform that supports the user's lower arm and wrist along the entire width of the keyboard. By creating the level typing surface, the present invention removes the requirement that the user's wrist be bent when typing on the keyboard.

The present invention provides flush, even support for typing on a keyboard while the user's wrist is supported along the full width of the keyboard. Additionally, the present invention offers a shelf for the keyboard to sit on, such that the typing surface of the keyboard is horizontally flush with the user's entire lower arm. The material superimposed onto the bottom surface of the pad has a natural adhesion, such that the keyboard sits firmly on the shelf, without moving around. The pad also offers extremely comfortable support for the user's entire lower arm. Preferably, the present invention is a soft pad made of "mouse pad" material that has a depth of 8 inches and a width of 17 inches. The present invention is designed to be the width of a keyboard. Additionally, a 1-inch section is removed from one end of the pad to create a shelf that is 0.25 inches lower than the rest of the pad. This lowered shelf enables the keyboard to sit level with the user's wrist. The rest of the pad is 7 inches deep. Thus, allowing the user's wrist and lower arm to rest.

DETAIL DESCRIPTIONS OF THE INVENTION

Figure 1:
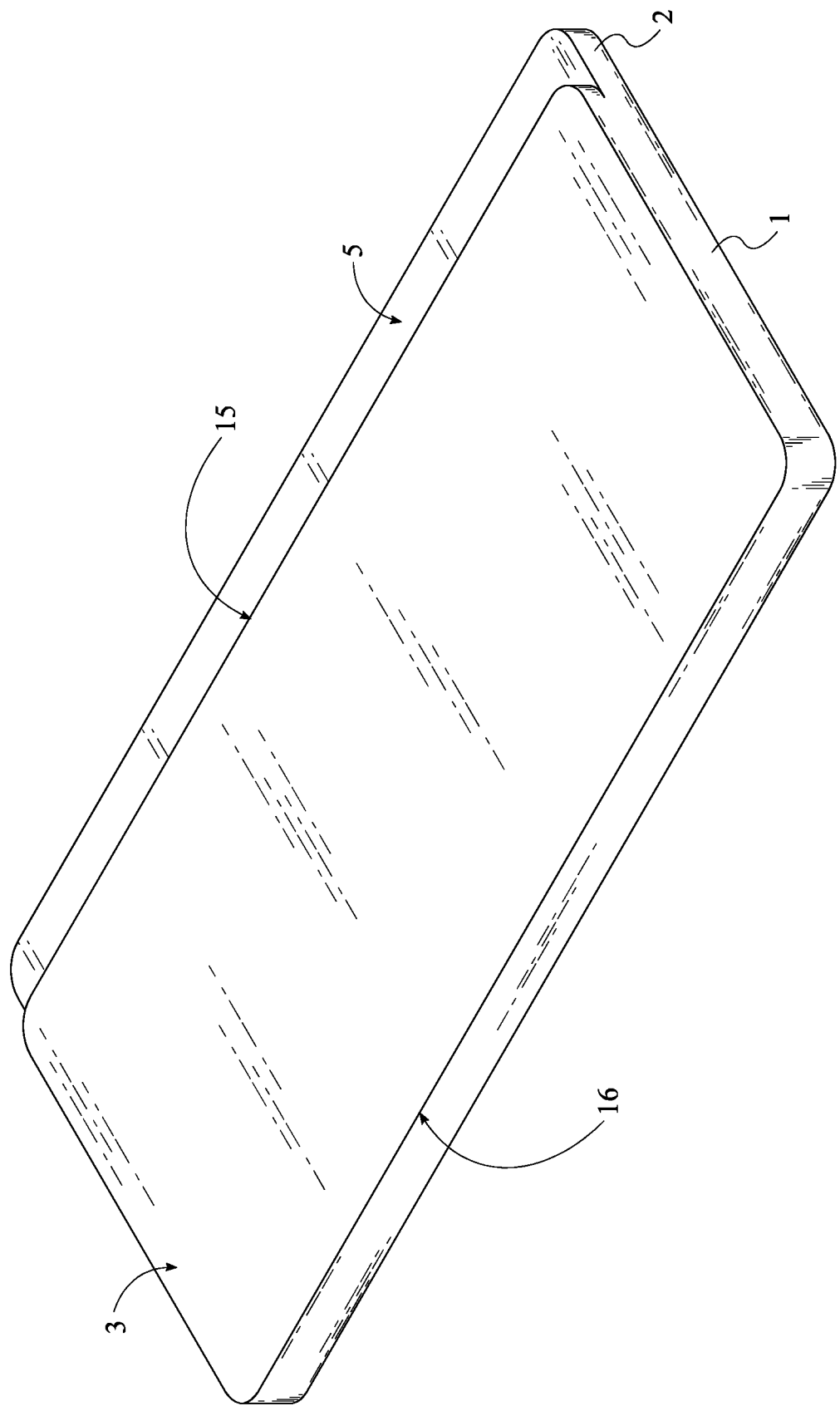
FIG. 1 is a front perspective view of the present invention.

All illustrations of the drawings are for the purpose of describing selected versions of the present invention and are not intended to limit the scope of the present invention.

Referring to FIG. 1 through FIG. 7, the present invention, the pad for supporting a user's wrist, lower arm, and keyboard while typing, is a device that promotes health and wellness by reducing the angle at which a user's wrist must be bent while typing. To achieve this, the present invention functions as an ergonomic support pad that maintains the typing surface of the keyboard in an orientation that is level with the surface of the pad. Thus, facilitating high typing speeds. Further, the present invention is designed to reduce the strain placed on the user's hands and wrists while typing. The present invention comprises a support panel 1, a shelf 2, a supportive liner 3, and a textured liner 4. Preferably, the support panel 1 is composed of a semi-material that deforms beneath the weight of the user's wrists and lower arms. Specifically, the support panel 1 is a flat piece of material that is placed beneath the user's wrists and lower arms and is used to maintain the user's wrists and lower arms in a desired orientation while typing. Additionally, the support panel 1 is designed to act as a compliant surface that distributes the weight of the user's wrist and lower arms so that the user experiences reduced levels of discomfort while typing. Further, the support panel 1 can be composed of materials that include, but are not limited to, foam, rubber, and synthetic compounds. Alternative embodiments of the present invention are designed with support panels 1 that are constructed using multiple layers of material which, when combined, provide therapeutic benefits to the user's wrists and lower arms.

Figure 2:
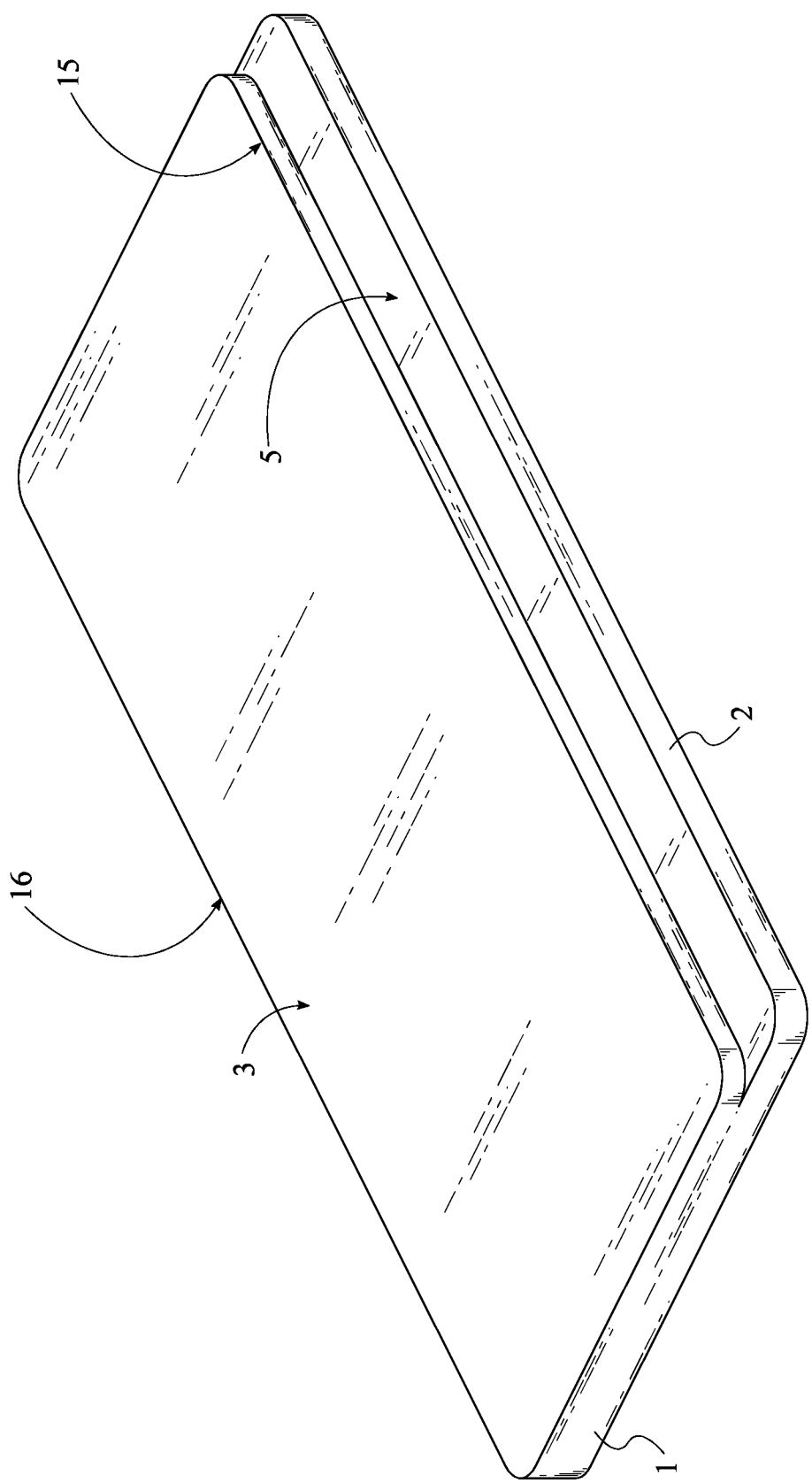
FIG. 2 is a rear perspective view of the present invention.
Figure 3:
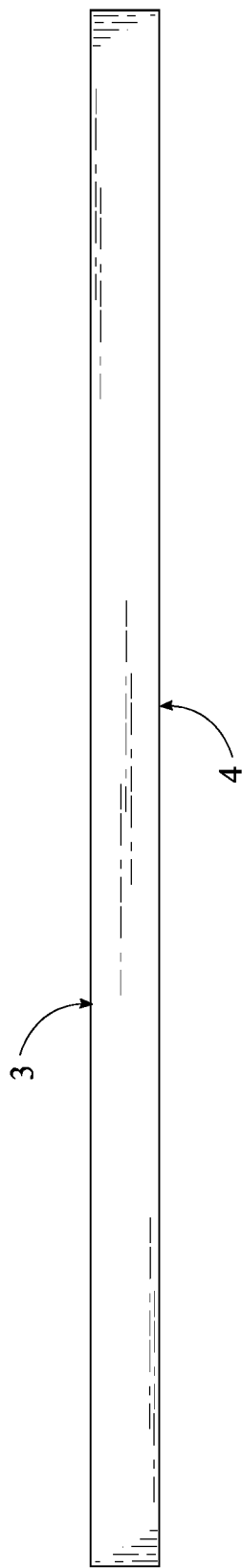
FIG. 3 is a front elevational view of the present invention.
Figure 4:
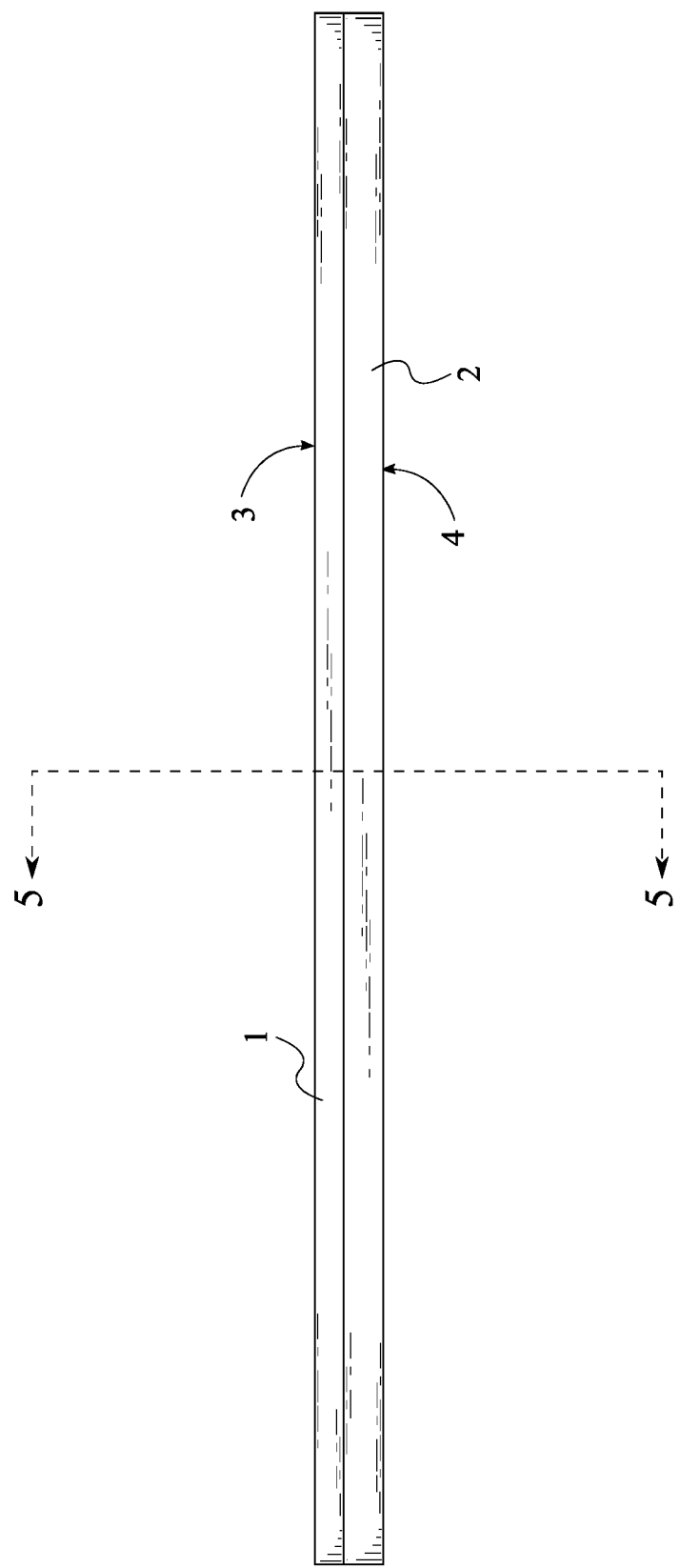
FIG. 4 is a rear elevational view of the present invention.
Figure 5:
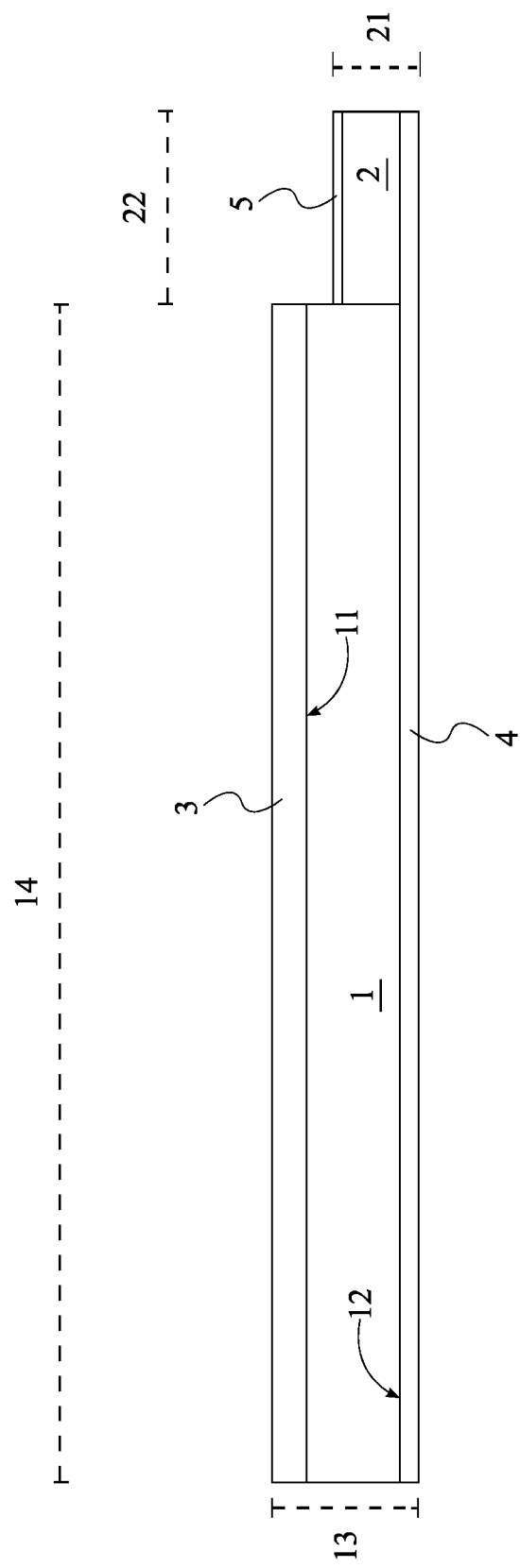
FIG. 5 is a right-side sectional view of the present invention taken along line 5-5 in FIG. 4.
Figure 6:
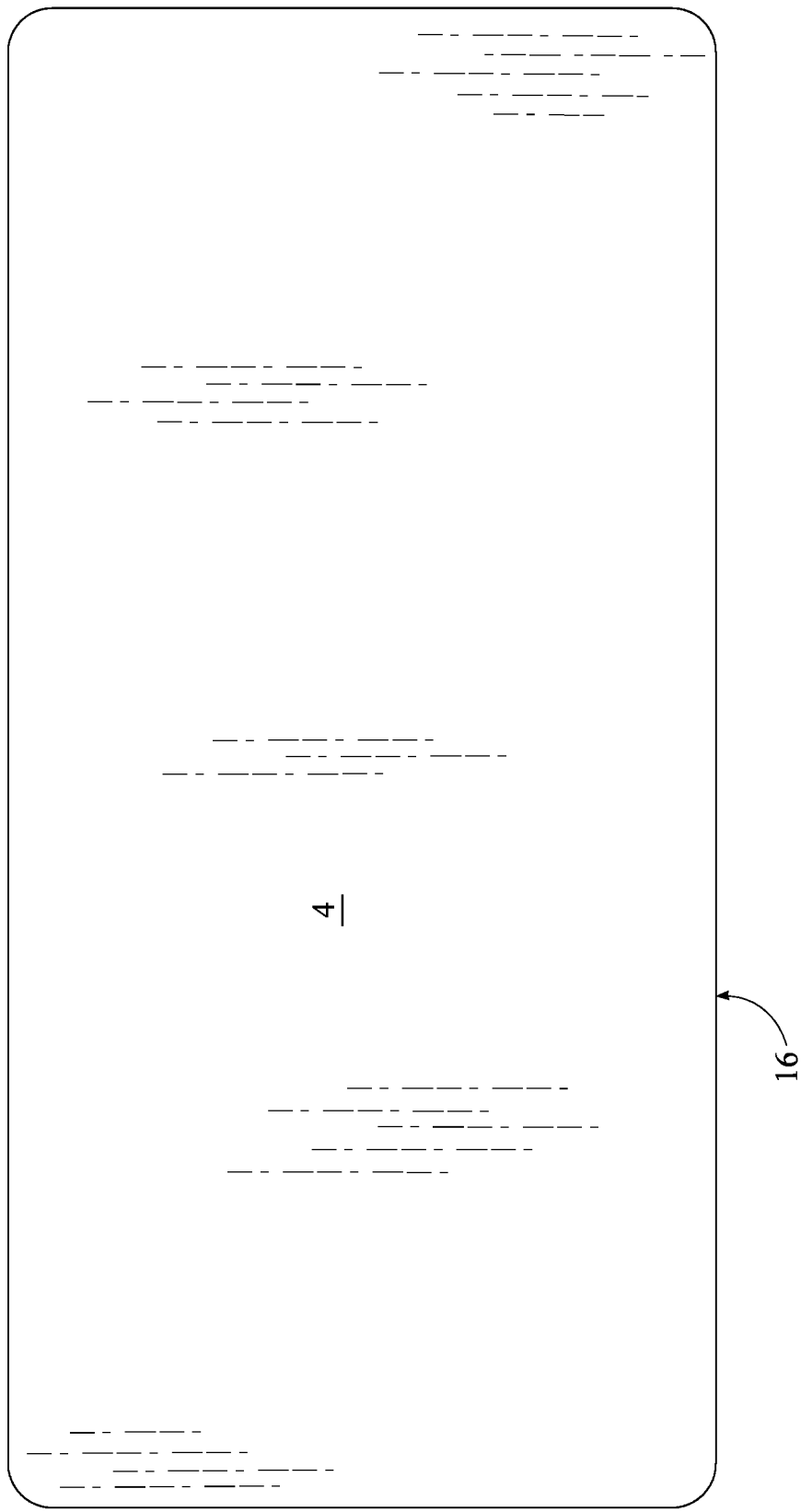
FIG. 6 is a bottom plan view of the present invention.
Figure 7:
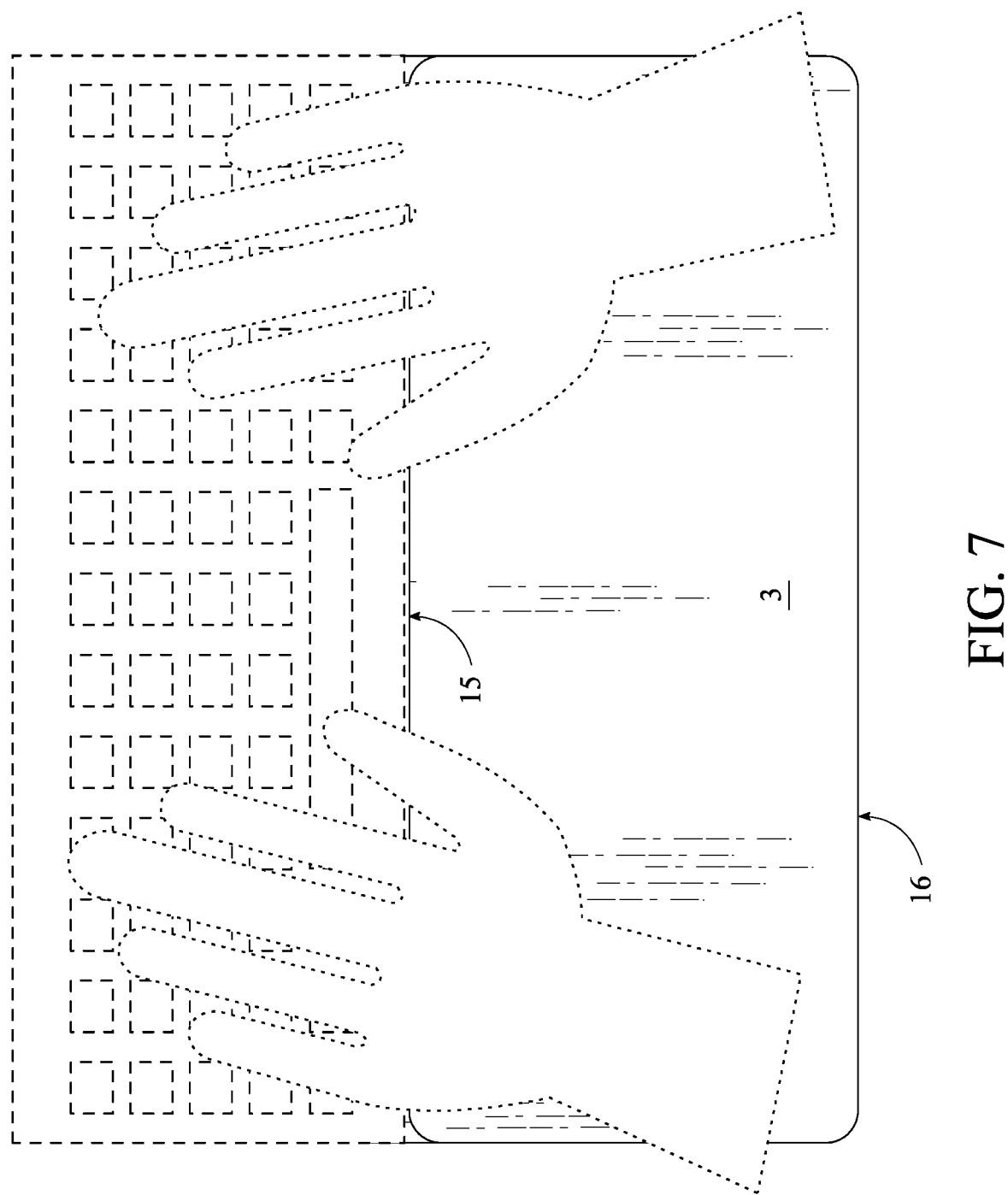
FIG. 7 is a top plan view of the present invention showing the user's hands and a keyboard.

Referring to FIG. 1, FIG. 2, and FIG. 5, the support panel 1 is designed to enable the user's wrists and upper arms to rest comfortably while typing, to increase the dexterity of the user's hands, and to prevent the keyboard from moving out of place. To facilitate this, the support panel 1 comprises a first face 11, a second face 12, a first widthwise edge 15, and a second widthwise edge 16. The first face 11 is positioned opposite to the second face 12 across the support panel 1. Accordingly, the first face 11 and the second face 12 delineate the overall flat shape of the support panel 1. Relatedly, the first widthwise edge 15 and the second widthwise edge 16 are positioned opposite to each other across the support panel 1. Accordingly, the support panel 1 is constructed in a sufficiently rectangular shape that corresponds to the dimensions of the keyboard being used. The shelf 2 is laterally connected to the support panel 1. Additionally, the shelf 2 is connected along the first widthwise edge 15. Consequently, the shelf 2 is positioned to maintain the keyboard in a desired orientation. Specifically, the shelf 2 is designed to maintain the keyboard in an orientation that is sufficiently level with the first face 11. To that end, a height 21 of the shelf 2 is less than a height 13 of the support panel 1. Accordingly, the shelf 2 is designed to act as a riser that supports a widthwise end of the keyboard, such that the keyboard is sufficiently level with the first face 11 of the support panel 1. To that end, the height 13 of the support panel 1 is preferably at least 0.75 inches.

Referring to FIG. 1 and FIG. 5, many keyboards are designed to have a sloping shape where one widthwise end is positioned above another. This configuration causes discomfort to the user and reduces productivity. The shelf 2 is designed to address this issue by acting as a riser that lifts the widthwise end of the keyboard that is lowered. Thus, reorienting the keyboard, such that the keys are sufficiently level with the first face 11 of the support panel 1. This configuration reduces the discomfort felt by the user and increases the user's typing speed. Preferably, the height 21 of the shelf 2 ranges from 0.25 inches to 0.75 inches. A depth 22 of the shelf 2 is less than a depth 14 of the support panel 1. Accordingly, the shelf 2 is designed to facilitate maintaining the keyboard to a desired orientation. Preferably, the depth 22 of the shelf 2 is at least 1 inch. Additionally, the depth 14 of the support panel 1 is preferably at least 7 inches. As such, the support panel 1 is shaped to function as an ergonomic device on which the user's wrists and lower arms may comfortably rest while typing.

Referring to FIG. 1 and FIG. 5, as described above, the present invention is designed to increase the user's comfort and productivity. As such, the present invention makes use of the supportive liner 3 and the textured liner 4 as surface treatments which enhance the user's comfort and productivity. Specifically, the supportive liner 3 is a soft material that is designed to bolster the support panel's 1 weight-distributing properties. The supportive liner 3 is superimposed onto the first face 11 of the support panel 1. Thus positioned, the supportive liner 3 acts as covering that bolsters the present invention's overall therapeutic and ergonomic functionalities. For example, because of the size of the support panel and the material properties of the supportive liner the user's wrist, lower arm, and fingers are able to travel smoothly across the keyboard without requiring that the user's arms be raised, or wrists be adjusted. Further, because of the supportive liner's material properties, the user can employ the present invention in lieu of a traditional mouse pad. The textured liner 4 is superimposed onto the second face 12 of the support panel 1. Thus positioned, the textured liner 4 prevents the support panel 1 from sliding across the surface on which the present invention is resting. The supportive liner 3 covers the surface of the support panel 1 on which the user's wrists and lower arms rest while typing. Conversely, the textured liner 4 covers the surface of the support panel 1 that comes into contact with a desk or table on which the present invention is placed.

Referring to FIG. 1 and FIG. 5, the present invention is designed to retain the keyboard in a desired orientation while typing. To that end, the present invention further comprises a shelf liner 5. The shelf liner 5 is preferably a textured material that is superimposed onto the shelf 2. Accordingly, the shelf liner 5 prevents the keyboard from inadvertently sliding off the shelf 2 while the user is typing.

Although the invention has been explained in relation to its preferred embodiment, it is to be understood that many other possible modifications and variations can be made without departing from the spirit and scope of the invention as hereinafter claimed.

What is claimed is:

1. A pad for supporting a user's wrist and lower arm and a keyboard while typing comprising:
   a support panel;
   a shelf;
   a supportive liner;
   a shelf liner;
   a textured liner;
   the support panel comprising a first face and a second face;
   the support panel comprising a first widthwise edge and a second widthwise edge;
   the first face of the support panel being oppositely positioned to the second face of the support panel across the support panel;
   the first widthwise edge of the support panel being oppositely positioned to the second widthwise edge of the support panel across the support panel;
   the first widthwise edge of the support panel and the second widthwise edge of the support panel being located in between the first face of the support panel and the second face of the support panel;
   the shelf comprising a first face and a second face;
   the shelf comprising a first widthwise edge and a second widthwise edge;
   the first face of the shelf being oppositely positioned to the second face of the shelf across the shelf;
   the first widthwise edge of the shelf being oppositely positioned to the second widthwise edge of the shelf across the shelf;
   the first widthwise edge of the shelf and the second widthwise edge of the shelf being located in between the first face of the shelf and the second face of the shelf;
   the second widthwise edge of the shelf being laterally connected to the first widthwise edge of the support panel;
   a height of the shelf being less than a height of the support panel;
   a depth of the shelf being less than a depth of the support panel;
   a width of the shelf being equal to a width of the support panel;
   the supportive liner being superimposed onto the first face of the support panel;
   the shelf liner being superimposed onto the first face of the shelf;
   the textured liner being superimposed onto the second face of the support panel and the second face of the shelf;
   the first widthwise edge of the shelf being a free edge; and
   a height of the shelf liner being less than a height of the supportive liner.

2. The pad as claimed in claim 1 wherein the shelf liner is a textured material.

3. The pad as claimed in claim 1 wherein the height of the shelf ranges from 0.25 inch to 0.75 inch.

4. The pad as claimed in claim 1 wherein the depth of the shelf is at least 1 inch.

5. The pad as claimed in claim 1 wherein the height of the support panel is at least 0.75 inch.

6. The pad as claimed in claim 1 wherein the depth of the support panel is at least 7 inch.

7. The pad as claimed in claim 1 wherein the support panel is deformable.

8. The pad as claimed in claim 1 wherein the width of the shelf being configured to be equal to a width of the keyboard.

9. The pad as claimed in claim 1 wherein the width of the support panel being configured to be equal to a width of the keyboard.

* * * * *